ELECTRICAL WAVE SYNCHRONIZING CIRCUIT

Filed Nov. 28, 1958 2 Sheets-Sheet 1

INVENTOR
C. W. FARROW
BY R. B. [signature]
ATTORNEY

ELECTRICAL WAVE SYNCHRONIZING CIRCUIT

Filed Nov. 28, 1958 2 Sheets-Sheet 2

INVENTOR
C. W. FARROW
BY
R. B. Ardis
ATTORNEY

United States Patent Office 2,979,662
Patented Apr. 11, 1961

2,979,662

ELECTRICAL WAVE SYNCHRONIZING CIRCUIT

Cecil W. Farrow, Coytesville, N.J., assignor to Bell Telephone Laboratories, Incorporated, New York, N.Y., a corporation of New York Filed Nov. 28, 1958, Ser. No. 777,135
9 Claims. (Cl. 328—139)

This invention relates to circuits for synchronizing or filtering electrical waves. Known synchronizing methods using a locally-generated wave ordinarily require some arrangement for automatic frequency control of the local generator. A principal object of the present invention is to generate a wave in synchronism with another wave without the need for automatic frequency control techniques. It is another object of the invention to improve the synchronization of electrical waves.

As an example of its application, the present invention may be used in systems for the transmission of pulse modulated waves. In "self-timed" pulse transmission systems, for example, it is necessary to generate, at various points in the system (the repeater stations and the receiving terminal), timing waves in synchronism with received pulse modulated waves. These systems are "self-timed" in that a separate timing channel is not provided; rather, timing information must be derived from the pulse modulated message wave itself. It will be seen, as the discussion progresses, that an illustrative embodiment of the invention may be used to derive such a timing wave.

As another example of its application, the invention in its various embodiments may be used as a very high-Q filter; for in regenerating waves supplied to its input, the filler eliminates undesirable spurious components of these waves.

Wave synchronism is accomplished, in accordance with the invention, by using twin homodyne channels in a homodyne process. A homodyne process may be defined as a process of detecting an incoming wave by the addition of a locally-generated wave of the same frequency as the incoming wave. In one illustrative embodiment of the invention an incoming wave is converted to an oscillatory wave having a frequency substantially equal to the fundamental or other desired frequency of the incoming wave. The oscillatory wave is then combined in each of the aforementioned twin homodyne channels with separate locally-generated waves, 90 degrees out of phase with respect to each other. These local or so-called carrier waves are produced by a precision oscillator and have a frequency equal to the desired frequency of the incoming wave. Desired in-phase components of the incoming and local waves are detected and used, in turn, to modulate the local waves. The outputs of the twin homodyne channels (the modulated local waves) are then combined to produce a wave in phase synchronism with the input wave.

It is an advantageous feature of the invention—exemplified by the illustrative embodiment discussed above—that it is not necessary to produce a carrier wave frequency identically equal to the desired frequency of the incoming wave. The need for automatic frequency control is thus obviated.

Figure 1:
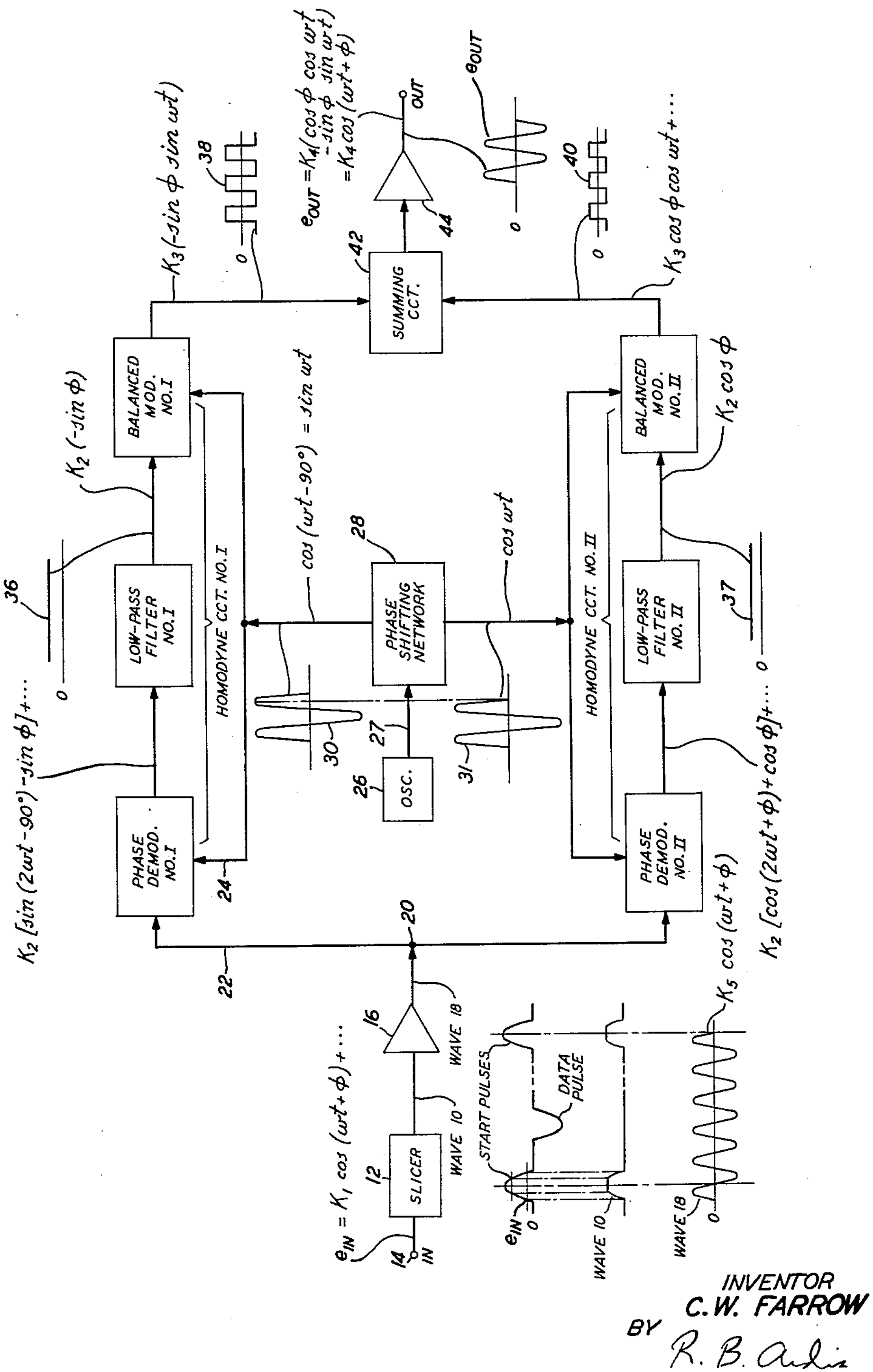
Figure 2:
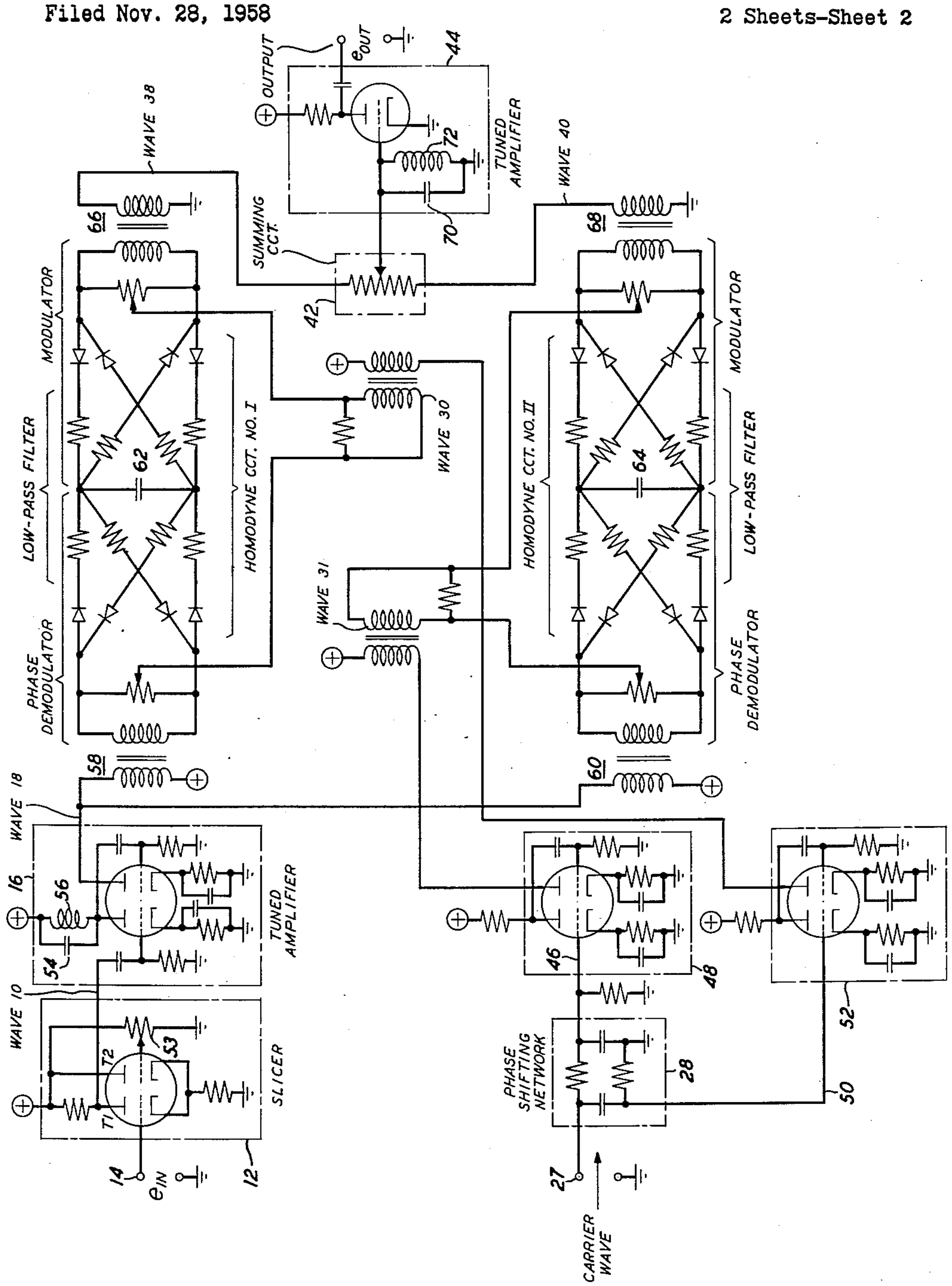

The invention will be understood more fully from the following more detailed description, read in conjunction with the accompanying drawing in which:

Fig. 1 is a block schematic diagram of an illustrative embodiment of the invention; and Fig. 2 is a detailed circuit diagram arranged in accordance with Fig. 1.

The incoming wave $e_{in}$ is supplied to the input terminal 14 of the circuit of Fig. 1 and is shown, for illustrative purposes, as a pulse modulated wave. Actually, it is a demodulated digital data signal. This wave consists of "start" pulses (defined below) and data pulses. In a digital data signaling system, information is sent as a series of bits, consisting of either the presence or absence of pulses. Each bit occupies a fixed interval of time and the rate at which these bits is transmitted is known as the "bit rate." A digital data signal is broken up into groups of bits known as words, each word being preceded by a start pulse to indicate the beginning of the word.

The circuit labled 12 is referred to as a "slicer" because its output wave 10 contains a "slice" of the input wave $e_{in}$ between two reference levels, as may be seen from a consideration of these waves (see Millman and Taub, "Pulse and Digital Circuits," page 117, published 1956 by McGraw-Hill Book Company, Incorporated). The slicer 12 "slices" the input wave $e_{in}$ between positive reference levels so that sliced start pulses are all that remain in the wave 10. The significance of the choice of reference levels will be discussed in connection with Fig. 2.

The amplifier 16 is tuned to the bit rate of the incoming wave $e_{in}$ and, therefore, generates a damped sinusoidal wave 18 having a frequency equal to this bit rate. It will be noted that while the wave 18 is a damped sinusoidal wave, the damping is not apparent in Fig. 1 because of the very short period of time over which the wave is plotted.

The wave 18 is fed over separate paths from juncture 20 to a pair of identical homodyne circuits. Each of these circuits consists of a phase demodulator, a low-pass filter, and a balanced modulator, interconnected in the order named.

It will be helpful at this point to define some of the terms used in the preceding paragraph. A "phase demodulator" is a device which measures or detects the difference in phase of one signal with respect to another. A "balanced modulator," on the other hand, is a device in which the amplitude of a carrier wave (in Fig. 1, the carrier wave 30, for example) is varied in proportion to the amplitude of a modulating wave (wave 36, for example). The sense of variation of amplitude of the carrier wave is rendered the same as that of the modulating wave. Thus, if the modulating wave were to become negative there would be a consequent phase reversal in the carrier wave. A "balanced" modulator may be distinguished from an "unbalanced" modulator in that, absent a modulating wave, the balanced modulator would have no output, whereas the output of the unbalanced modulator would be the carrier wave. It should be noted that the modulators and phase demodulators of Fig. 2, though they serve different purposes, are identical in structure.

Since the homodyne circuits I and II are identical, it will be sufficient to describe the operation of either of them. Homodyne circuit No. I will therefore be described. The incoming wave 18 is supplied to the phase demodulator No. I via input lead 22. The locally-generated carrier wave 30 is also supplied thereto via input lead 24. The phase demodulator, as previously mentioned, detects the relative phase difference between these waves. The output of the demodulator is a direct-current signal related to this phase difference.

Carrier wave 30 is generated by oscillator 26 and shifted in phase by the network 28. The shifting network 28 produces two waves 30 and 31 in quadrature with one another. Oscillator 26 is a precision oscillator and may be, for example, a tuning fork oscillator. As previously mentioned, the frequency of oscillator 26 is chosen to be equal to the desired frequency of the incoming wave $e_{in}$. In accordance with well-known modulation principles, the amplitude of carrier wave 30 is ideally much greater than that of the incoming wave 18. The large amplitude of the carrier waves is necessary, as will be understood in the discussion which follows, in order to insure that sharply-defined on-off switching is achieved by the asymmetrically conductive devices (namely, the diodes of Fig. 2) of the modulators and phase demodulators.

Because the desired component of the wave $e_{in}$ and the carrier waves 30 and 31 are generated by different sources, a phase difference between these waves can be expected. Thus, a consideration of the first terms of the Fourier expansions for the waves $e_{in}$ and 31 reveals an exemplary phase difference of $\Phi$ degrees between these waves. In accordance with the invention, the phase difference between the incoming wave $e_{in}$ and the carrier wave generated by oscillator 26 is eliminated so that the result, as shown in Fig. 1, is an output wave $e_{out}$ which is in phase synchronism with the input wave $e_{in}$ and which has the same frequency as the desired frequency component of $e_{in}$ (in the illustrative example, the bit rate of $e_{in}$).

The manner in which this phase synchronism is accomplished will be described, first in a qualitative way and then mathematically. The mathematical description will not be rigorous; rather, it will be limited for the sake of simplicity. Thus, terms of second order significance will be ignored.

First, then, the qualitative description will be given. An incoming signal $e_{in}$—be it a pulse modulated wave, a noise laden sinusoid or any complex wave—has a desired frequency component from which it is sought to generate a wave of the same frequency as this component and in phase synchronism therewith. It should be mentioned here that phase synchronism of two waves does not require that these waves be of identical phase. If they are, in fact, in phase synchronism, they differ—if at all—by a constant, unvarying phase angle. This difference may be readily eliminated, for example, by delaying one of the waves. In the illustrative embodiment of Fig. 1, it is, therefore, immaterial that the wave $e_{out}$ is represented as having a phase angle identical to that of the input wave $e_{in}$. If this is not the case in practice, then it should be understood that so long as the waves $e_{in}$ and $e_{out}$ are in phase synchronism (as they in fact are by virtue of the present invention) any phase difference between the waves may be eliminated simply by providing suitable delay means in the amplifier 44, for example, or by performing this phase aligning process in a subsequent circuit. What is important here, therefore, is not that the waves be of identical phase but that they be in phase synchronism. Now, the wave $e_{in}$ is converted to a damped sine wave having a fundamental frequency equal to the frequency of some desired component of $e_{in}$ (in the illustrative example, the bit rate of that input wave). The local oscillator 26 has, for all practical purposes, a stable frequency and this frequency is substantially equal to the above-noted desired frequency. By combining the converted wave (the wave 18) with quadrature components of the local oscillator (the waves 30 and 31), those components of the converted wave in phase with the quadrature components may be detected. A phase demodulator accomplishes this detection in each of the homodyne circuits Nos. I and II. In each of the homodyne circuits the in-phase component is filtered through a low-pass filter and then used, in turn, to modulate its associated local oscillator wave in a balanced modulator.

A word should be said here concerning the efficacy of low-pass filters in the homodyne process just described. In accordance with the invention, advantage is taken of the fact that the desired in-phase components (as represented, for example, by the waves 36 and 37 in Fig. 1) are direct-current signals respectively related to phase differences between the desired component of wave 18 and the in-quadrature waves 30 and 31.

A sketch of any two waves of different frequency will show that the phase difference between the two waves continuously varies. Bearing this in mind, it will be understood that detected phase differences between undesired components of the wave 18 and the local oscillator waves 30 and 31 will vary at a relatively rapid rate, whereas any phase difference between the desired component of wave 18 and the oscillator waves 30 and 31 (remembering that this component and the oscillator waves are of substantially the same frequency) will vary, if at all, very slowly. That this desired component and the oscillator waves 30 and 31 are of substantially the same frequency has already been mentioned. However, the reason for this has been only partly explained. Thus, it also has been mentioned that the local oscillator 26 is a precision oscillator whose frequency is extremely stable and nearly as possible equal to the desired frequency component of the input wave $e_{in}$. But, nothing has been said of the frequency stability of the desired component of the wave $e_{in}$, and hence its progeny, wave 18. It should be noted here, therefore, that the frequency of this desired component may be assumed practically unvarying, since very precise oscillators are used initially to produce a wave such as $e_{in}$. See, to this effect, page 379 of the article, "A High-Speed Data Signaling System," Bell Laboratories Record, vol. 36, p. 376 (October 1958).

The in-quadrature waves 30 and 31 and the desired component of incoming wave 18 are thus not only of substantially equal frequency but, more importantly are very stable from a frequency standpoint. It will be understood, then, that the desired phase difference components appearing at the outputs of phase demodulators Nos. I and II will be, at most, very slowly varying direct-current signals. Because they vary, if at all, so slowly, these desired phase difference signals may be filtered by a low-pass filter (e.g., by filter No. I). Rapidly-varying phase difference components—that is to say rapidly varying with respect to the desired phase-difference component—of the demodulator outputs, which components correspond to frequency differences between the local oscillator frequency and any undesired frequency components of the wave 18, are thereby suppressed by low-pass filters Nos. I and II. By making the cut-off frequency of these filters very low, undesired phase difference components related to frequencies very close to that of the desired component of wave 18 can be eliminated.

A mathematical analysis of the manner in which phase synchronism is accomplished in the circuit of Fig. 1 will now be given. In the following analysis only those terms which are of present interest will be considered. Other, undesired, components present in the various waves are eliminated in the low-pass filters and the output tuned amplifier 44.

Let it be assumed that the component of interest in the input wave $e_{in}$ is $\cos(\omega t+\Phi)$. When this component is combined in phase demodulator No. I with $\sin(\omega t)$, the mathematical representation of carrier wave 30, the output product of interest may be denoted as $K_2[\sin(2\omega t-90°)-\sin\Phi]$. By trigonometric reduction, the last expression becomes $K_2(-\cos 2\omega t-\sin\Phi)$. The term $\cos 2\omega t$ is suppressed in low-pass filter No. I, so that the output of this filter may be denoted $K_2(-\sin\Phi)$. (The last-named term has been graphically illustrated in Fig. 1 as the steady signal 36). The term $K_2(-\sin\Phi)$ is now combined with $\sin\omega t$ (the mathematical representation of carrier wave 30) in balanced modulator No. I to yield the modulation product $K_3(-\sin\Phi\sin\omega t)$, the only product of interset at this point. The process which has just been described in connection with homodyne circuit No. I is duplicated in homodyne circuit No. II. Thus, the modulation product of interest, produced by balanced modulator No. II, may be denoted as $K_3(\cos \Phi \cos \omega t)$. The output products of the balanced modulators Nos. I and II are then combined in summing circuit 42. The tuned amplifier 44 is tuned to a frequency equal to the bit rate of the incoming wave $e_{in}$. Thus, the output wave $e_{out}$ of amplifier 44 may be denoted as $$K_4(\cos \Phi \cos \omega t - \sin \Phi \sin \omega t)$$

i.e., as $K_. \cos (\omega t + \Phi)$. It can be seen, therefore, that the wave $e_{out}$ is the desired component of the input wave $e_{in}$.

The amplitude of wave 37 is proportional to the magnitude of the cosine of the phase difference $\Phi$ between the incoming sinusoidal wave 18 and the carrier wave 31. The angle $\Phi$, it can be seen, is the phase angle of wave 18 with respect to that of wave 31. The polarity of wave 37 is dependent upon the sign of $\cos \Phi$. Wave 37 is thus positive when the angle $\Phi$ falls within the range minus 90 degrees to plus 90 degrees, and is negative when $\Phi$ falls within the range plus 90 degrees to minus 90 degrees. The angle $\Phi$ in the illustrative example of Fig. 1, it will be noted, falls within the first-mentioned range of values, since the wave 37 is positive. Similar reasoning will show that the wave 36 is positive when the angle $\Phi$ falls within the range 180 degrees to 360 degrees (i.e., the negative range, zero degrees to minus 180 degrees) and is negative when the angle $\Phi$ falls within the positive range, zero degrees to 180 degrees.

Fig. 2 shows a detailed illustrative embodiment of the invention. First, the pre-homodyne circuitry will be considered. Included in this description will be the operations performed on the input wave $e_{in}$ as it is transmitted through the slicer 12, the tuned amplifier 16, and thence to the phase demodulators. The next consideration will be of the carrier or local oscillator wave circuitry—more specifically, the path of the carrier wave through the phase shifting network 28 and the amplifiers 48 and 52 to the phase demodulators. The homodyne process, i.e., the combination of the incoming wave and the in-quadrature carrier waves in the twin homodyne circuits, the detection of in-phase components of these waves, the suppression of other, undesired, components, and the modulation of the carrier waves by these in-phase components, will be dealt with next. Finally, the summation of the modulated outputs of the twin homodyne circuits and the selection from this summation of a desired frequency component to yield the wave $e_{out}$, will be described.

The slicer 12 is here shown in a cathode-coupled arrangement. As previously mentioned, the circuit is referred to as a "slicer" because the output wave 10 contains a "slice" of the incoming wave $e_{in}$ between two reference levels; that is to say, the circuit clips the incoming wave at two levels and transmits the portion lying between them. It should be noted here that the levels at which the slice is taken will determine the width of the pulses of wave 10 (see Fig. 1). Slicer 12 serves, in this particular embodiment, to slice the positive-going start pulses of the wave $e_{in}$ between appropriate positive levels. All of the negative data pulses are thus eliminated. A sufficiently large positive excursion of the incoming wave $e_{in}$ will cut off the tube $T_2$, while a negative excursion of this wave will cut off the tube $T_1$. Between these cut-off levels the slicer 12 is simply an inverting amplifier. The levels at which the wave $e_{in}$ is sliced, to be discussed in greater detail in connection with the tuned amplifier 16, are dependent upon the setting of potentiometer 53.

Wave 10 rings the tuned amplifier 16. The tank circuit consisting of capacitor 54 and inductor 56 thereupon goes into oscillation. This tank circuit is tuned to a frequency equal to the desired frequency (here, the bit rate) of the incoming wave $e_{in}$. Wave 18, the output of amplifier 16, is supplied to homodyne circuits Nos. I and II via transformers 58 and 60, respectively.

The amplitude of wave 18 varies as the width of the sliced pulses of wave 10. For maximum amplitude of wave 18, the width of these pulses is ideally an odd number of half cycles of the frequency to which amplifier 16 is tuned. The reason a pulse width of an odd number of half cycles of the tuned frequency (and thus of the wave 18) maximizes the amplitude of waves 18 may be explained as follows. The voltage across the tuned circuit of amplifier 16 varies as the amplitude of wave 10. Accordingly, the leading edge of a pulse in wave 10 causes the voltage across this tuned circuit to go positive, after which the tuned circuit rings at its natural frequency. Note, then, that at any time equal to an odd number of half cycles after the initiation of the tuned circuit oscillation, the voltage across the tuned circuit will be negative-going. Now, if the trailing (negative-going) edge of the above-mentioned pulse also occurs at this time, it will reinforce, i.e., give added impetus to the negative-going tuned circuit voltage, thus maximizing this voltage. It can be seen, on the other hand, that if the trailing edge of the pulse occurs after a period equal to the lapse of an even number of half cycles of the tuned circuit voltage—at which time the tuned circuit voltage is positive-going—the trailing edge will not reinforce the tuned circuit voltage. On the contrary, cancellation will occur, thus minimizing the amplitude of wave 18. Since the levels between which the wave $e_{in}$ is sliced, and hence the pulse width of wave 10, depend upon the setting of potentiometer 53, the amplitude of wave 18 may be maximized by proper adjustment of this potentiometer.

The carrier wave generated by oscillator 26 (not shown in Fig. 2) is supplied to the phase shifting network 28 which, it will be noted, is a simple resistance-capacitance network. The resistance and capacitance values of network 28 are chosen in a manner well known so that the carrier wave supplied to input 27 is shifted by 45 degrees in each of the transmission paths leading from network 28. These 45-degree shifts in phase are in opposite directions. Thus, the carrier wave at the input 46 of amplifier 48 is 90 degrees out of phase with respect to the carrier wave at the input 50 of amplifier 52. The carrier waves are thus in quadrature with one another.

It will be noted that amplifiers 48 and 52 are identical. They are conventional two-stage, resistance-capacitance-coupled amplifiers, having transformer-coupled output circuits. Amplifiers 48 and 52, in amplifying the carrier waves 31 and 30, insure definite on-off switching of the diodes included in the homodyne circuits. These carrier waves are transformer-coupled to homodyne circuits Nos. I and II.

The wave 18 and the carrier waves 30 and 31 are now combined in the homodyne circuits. As in the discussion of Fig. 1, it is sufficient here merely to describe homodyne circuit No. I. It was mentioned in connection with Fig. 1 that the phase demodulator detects any phase difference which may exist between the wave 18 and the carrier wave 30. The phase demodulator, however, does more than just detect a phase difference between these waves. It detects the relative phase difference of these waves so that the polarity, as well as the magnitude of the phase difference, may be ascertained. The output of the phase demodulator is supplied to the low-pass filter consisting of the capacitor 62 and the network of resistors in series with the diodes.

The rate of decay of the low-pass filter output wave 36 (see Fig. 1) is determined by the time constant of capacitor 62 and its associated network of resistors. In data transmission the optimum value of this time constant will depend upon the maximum transmittible word length. It will be understood, for example, that the time constant required for the transmission of words 256 bits in length will necessarily be longer than the time constant required for the transmission of words 64 bits in length.

This is because of the greater time interval between the start pulses of the 256-bit words. The direct-current output of the low-pass filter (wave 36, for which see Fig. 1) is next supplied to the modulator of homodyne circuit No. I, where it is used to modulate the carrier wave 30. The resultant modulated output wave 38 (see Fig. 1) is substantially a square wave in view of the "on-off" switching of the diodes of the modulator by carrier wave 30. The modulators of Fig. 2, as previously mentioned, are balanced modulators, and are identical in structure to the phase demodulators. They are both commonly known as ring modulators. The manner in which ring modulators operate is very well known in the art; see, for example, Terman, "Radio Engineers' Handbook," pages 552–553, McGraw-Hill Book Co. (1943).

Wave 40 is derived from homodyne circuit No. II in a manner similar to that in which wave 38 is derived. Wave 38 is combined with wave 40 in the summing circuit 42. Summing circuit 42 is here shown simply as a potentiometer, its variability allowing a balance of the outputs of the homodyne circuits. The output of summing circuit 42 is next supplied to the tuned amplifier 44. Amplifier 44 selectively amplifies the desired frequency component present in the output wave of summing circuit 42, namely, the component having a frequency equal to the desired frequency component of the input wave $e_{in}$ (in the illustrative example of Fig. 1, the bit rate). The tank circuit consisting of capacitor 70 and inductor 72 is, therefore, tuned to the bit rate of the incoming wave $e_{in}$. The output wave $e_{out}$ is thus, in accordance with the invention, in phase synchronism with the input wave $e_{in}$.

The circuit of Fig. 2 may also serve as a sharply-tuned filter, tuned to the local oscillator frequency. The slicer 12 can be dispensed with in this application. It can be eliminated, for example, where it is desired to extract a single frequency from a noisy incoming wave. The bandwidth of the circuit is determined by the bandwidth of the low-pass filter and is, accordingly, comparatively narrow. Such a circuit may be advantageously employed where high-Q filtration of electrical waves is required: as already alluded to, for example, where it is desired to separate a desired frequency component from a number of unwanted components nearby in the spectrum, or where it is desired to improve signal-to-noise ratio.

Although the invention has been described with reference to specific embodiments, they should be looked upon as illustrative, for the invention also encompasses such other embodiments as come within its spirit and its scope.

What is claimed is:

1. In a sharply-tuned filter circuit for selecting a specified frequency from a wave supplied to its input, the combination of: means for converting said incoming wave to a sinusoidal wave having a frequency substantially equal to said specified frequency; means for generating a carrier wave of substantially the same frequency as said specified frequency; a pair of homodyne circuits; means, including two separate channels, for conveying said carrier wave to each of said homodyne circuits via an associated one of said channels; phase-shifting means interconnecting said separate channels and said carrier wave generator for shifting the phase of said separately-channeled carrier waves 90 degrees with respect to each other; means for supplying said incoming sinusoidal wave to each of said homodyne circuits; each of said homodyne circuits including a phase demodulator for detecting the magnitude and polarity of any phase difference between its associated carrier wave and said incoming sinusoidal wave, a low-pass filter, and a balanced modulator for modulating the output wave of said low-pass filter and said associated carrier wave; said phase demodulator, low-pass filter and balanced modulator being interconnected in the order named; means for summing the output waves of said balanced modulators; and amplifier means tuned to said specified frequency for amplifying the output wave of said summing means.

2. A filter circuit in accordance with claim 1 in which said phase demodulators and balanced modulators are ring modulators.

3. A filter circuit in accordance with claim 1 in which the phase demodulator and balanced modulator of each of said homodyne circuits are conductively intercoupled by their associated low-pass filter.

4. A phase synchronizing circuit having an input to which a wave of predetermined fundamental frequency or bit rate is supplied, comprising: means for locally generating a wave of frequency substantially equal to said fundamental frequency; a pair of parallel-connected homodyne circuits; means for supplying said input wave to each of said homodyne circuits; means for producing from said local wave a pair of waves in quadrature with one another; means for supplying to each of said pair of homodyne circuits an individually associated one of said pair of quadrature waves; each of said homodyne circuits including: means for detecting in-phase components of said input wave and an associated one of said in-quadrature waves, means for suppressing components other than said in-phase components from the output of said detecting means, and modulating means for modulating said associated one of said in-quadrature waves with said in-phase components; and means for summing the output waves of said modulating means to produce a wave in phase synchronism with said input wave.

5. In a circuit for generating an output wave in phase synchronism with an input wave having a predetermined fundamental frequency component, means to generate a carrier wave having a frequency substantially equal to said fundamental frequency of said input wave, means to separate said carrier wave into a plurality of components differing in phase from one another by a predetermined amount, means to detect the associated phase difference signal between each of said carrier wave components and said input wave, means to individually filter each of said phase difference signals, means to modulate the amplitude of each of said carrier wave components in accordance with its associated phase difference signal, and summing amplifier means tuned to said fundamental frequency to combine the modulated carrier wave components into a single output wave in phase synchronism with said input wave.

6. A circuit in accordance with claim 5 wherein said plurality of components consists of two components and said predetermined phase difference is 90 degrees.

7. In a circuit for generating an output wave in phase synchronism with an input wave having a predetermined fundamental frequency component, means to slice said input wave at predetermined levels, filter-amplifier means tuned to said fundamental frequency to extract said fundamental frequency component from said sliced input wave and to generate therefrom a sine wave of said frequency, means to generate a carrier wave having a frequency substantially equal to said fundamental frequency of said input wave, means to separate said carrier wave into a plurality of components differing in phase from one another by a predetermined amount, means to detect the associated phase difference between each of said carrier wave components and said sine wave, means to suppress all components of each of said detected phase differences other than in-phase components thereof, means to modulate the amplitude of each of said carrier wave components in accordance with its associated in-phase component, and means to combine the modulated carrier wave components into a single output wave in phase synchronism with said input wave.

8. A phase synchronizing circuit having an input and an output, said input being supplied by waves of a prescribed fundamental frequency or data bit rate, comprising: means for generating a carrier wave of substantially said fundamental frequency, a pair of parallel-connected homodyne circuits each comprising a phase demodulator, a low-pass filter, and a balanced modulator interconnected in the order named, means for supplying said input wave to each of said homodyne circuits, means for supplying said carrier wave also to each of said homodyne circuits and including phase-shifting means for shifting the phase of said carrier waves supplied to said homodyne circuits by 90 degrees with respect to each other, and means for summing the output waves of said homodyne circuits.

9. A phase synchronizing circuit having an input and an output, said input being supplied by waves of a prescribed fundamental frequency or data bit rate, comprising: means for generating a carrier wave of substantially said fundamental frequency; a pair of parallel-connected homodyne circuits; means, including a slicer circuit and a tuned amplifier tuned to the fundamental frequency or pulse repetition rate of said input wave, for supplying said input wave to each of said homodyne circuits; means for supplying said carrier wave also to each of said homodyne circuits and including phase-shifting means for shifting the phase of said carrier waves supplied to said homodyne circuits by 90 degrees with respect to each other; and means for summing the output waves of said homodyne circuits.

References Cited in the file of this patent

UNITED STATES PATENTS

| | | |
|---|---|---|
| 2,575,047 | Crosby | Nov. 13, 1951 |
| 2,758,204 | Norby | Aug. 7, 1956 |
| 2,797,314 | Eglin | June 25, 1957 |
| 2,828,414 | Rieke | Mar. 25, 1958 |
| 2,835,803 | Bose | May 20, 1958 |